United States Patent
Islam et al.

(10) Patent No.: US 11,791,676 B2
(45) Date of Patent: Oct. 17, 2023

(54) ELECTRIC MOTOR HAVING ROTOR ASSEMBLY WITH SEGMENTED PERMANENT MAGNET

(71) Applicant: HL MANDO CORPORATION, Gyeonggi-do (KR)

(72) Inventors: Md Sariful Islam, Bay City, MI (US); Mohammad Islam, Bay City, MI (US)

(73) Assignee: HL MANDO CORPORATION, Gyeonggi-Do (KR)

( * ) Notice: Subject to any disclaimer, the term of this patent is extended or adjusted under 35 U.S.C. 154(b) by 141 days.

(21) Appl. No.: 16/920,327

(22) Filed: Jul. 2, 2020

(65) Prior Publication Data

US 2022/0006337 A1 Jan. 6, 2022

(51) Int. Cl.
H02K 1/27 (2022.01)
H02K 1/02 (2006.01)

(52) U.S. Cl.
CPC ................ *H02K 1/27* (2013.01); *H02K 1/02* (2013.01)

(58) Field of Classification Search
CPC ............ H02K 1/02; H02K 1/27; H02K 1/276; H02K 1/2766; H02K 21/14; H02K 2213/03; H01F 1/055; H01F 1/057
See application file for complete search history.

(56) References Cited

U.S. PATENT DOCUMENTS

| | | | |
|---|---|---|---|
| 8,269,392 B2 * | 9/2012 | Doi | ........................ H02K 1/278 310/156.56 |
| 9,059,621 B2 | 6/2015 | Aoyama | |
| 9,876,397 B2 * | 1/2018 | Zhang | .................. H02K 1/2773 |
| 2010/0237735 A1 * | 9/2010 | Blissenbach | ............. H02K 1/02 310/156.53 |
| 2012/0091848 A1 * | 4/2012 | Sakai | .................... H02K 1/2766 310/156.43 |
| 2012/0126637 A1 * | 5/2012 | Ankeney | ................ H02K 15/03 310/43 |
| 2019/0068008 A1 * | 2/2019 | Gao | ......................... H02K 1/02 |
| 2019/0222076 A1 * | 7/2019 | Tangudu | ................ H02K 15/03 |
| 2020/0083768 A1 * | 3/2020 | Yim | ..................... H02K 21/021 |

FOREIGN PATENT DOCUMENTS

KR 10-2007-0092804 9/2007

* cited by examiner

*Primary Examiner* — Thomas Truong
(74) *Attorney, Agent, or Firm* — Ladas & Parry, LLP

(57) ABSTRACT

A permanent magnet motor comprises: a rotor assembly configured to be rotatable relative to a stator, wherein the rotor assembly defines magnet pockets, a segmented permanent magnet comprising a plurality of magnet segments, which include one or more magnet segments of the segmented permanent magnet have different magnetic material from another or other magnet segments of the segmented permanent magnet, is disposed in each of the magnet pockets of the rotor assembly. The segmented permanent magnet is segmented in a circumferential direction. The one or more magnet segments of the segmented permanent magnet comprises magnetic material having higher coercivity, or operable at a higher temperature, than the another or other magnet segments of the segmented permanent magnet. The one or more magnet segments of the segmented permanent magnet comprise rare earth permanent magnet, high energy density magnet, samarium cobalt (Sm—Co) magnet or neodymium iron boron (Nd—Fe—B) magnet.

21 Claims, 6 Drawing Sheets

ELECTRIC MOTOR HAVING ROTOR ASSEMBLY WITH SEGMENTED PERMANENT MAGNET

BACKGROUND

Various embodiments of the present disclosure relate in general to an electric motor, and more particularly, to a structure and components of a rotor assembly of a permanent magnet motor to improve motor performance and reduce torque ripple.

A motor is a well-known electrical machine that converts electrical energy into mechanical energy using magnetic field linkage. Permanent magnet electric motors are known for their high efficiency. The permanent magnet motors are also known for their durability, controllability, and absence of electrical sparking. Due to their advantages the permanent magnet motors are widely used in automobile applications.

However, one of the well-known problems of the permanent magnet motor is torque ripple. Sources of torque ripple in the permanent magnet motors include inherent harmonics in the flux linkage, and cogging. Cogging may be a term used to describe the torque of the permanent magnet motor disconnected from the power source. Presence of harmonics in the flux linkage results in instantaneous torque that pulsates as a function of the rotor position. Torque ripple may be generally undesirable in many permanent magnet motors applications, particularly at low speed.

High energy density permanent magnets may crucial to the design of permanent magnet motors for vehicles. Current motor designs may use rare earth permanent magnets which easily meet the performance goals. However, there are the rising concerns over cost and unstable supply of rare earth resources.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

According to various embodiments of the present disclosure, a rotor assembly of a permanent magnet motor, configured to be rotatable relative to a stator, may have a plurality of magnet pockets, wherein each of the magnet pockets includes a segmented permanent magnet comprising a plurality of magnet segments, for example, but not limited to, high and lower temperature magnet segments. The segmented permanent magnet including high and lower temperature magnet segments may reduce undesirable torque ripple that may result in unwanted vibration and noise, may achieve better demagnetization performance, and may lower manufacturing cost of the permanent magnet motor in comparison with a motor having a single piece of permanent magnet.

According to some exemplary embodiments of the present disclosure, a permanent magnet motor may comprise: a rotor assembly configured to be rotatable relative to a stator, wherein the rotor assembly defines a plurality of magnet pockets, a segmented permanent magnet comprising a plurality of magnet segments, which include one or more magnet segments of the segmented permanent magnet have different magnetic material from another or other magnet segments of the segmented permanent magnet, is disposed in each of the magnet pockets of the rotor assembly. The segmented permanent magnet may be segmented in a circumferential direction. The one or more magnet segments of the segmented permanent magnet may comprise rare earth permanent magnet or high energy density magnet. The one or more magnet segments of the segmented permanent magnet may comprise samarium cobalt (Sm—Co) magnet or neodymium iron boron (Nd—Fe—B) magnet.

The one or more magnet segments of the segmented permanent magnet may comprise magnetic material having higher coercivity than the another or other magnet segments of the segmented permanent magnet. The one or more magnet segments of the segmented permanent magnet, comprising magnetic material having higher coercivity than the another or other magnet segments of the segmented permanent magnet, may be disposed at opposite ends of the segmented permanent magnet, and the another or other magnet segments of the segmented permanent magnet, comprising magnetic material having lower coercivity than the one or more magnet segments of the segmented permanent magnet, may be disposed in a middle of the segmented permanent magnet. The one or more magnet segments of the segmented permanent magnet, comprising magnetic material having higher coercivity than the another or other magnet segments of the segmented permanent magnet, may be smaller than the another or other magnet segments of the segmented permanent magnet, comprising magnetic material having lower coercivity than the one or more magnet segments of the segmented permanent magnet. A length of the one or more magnet segments of the segmented permanent magnet, comprising magnetic material having higher coercivity than the another or other magnet segments of the segmented permanent magnet, may be shorter than a length the another or other magnet segments of the segmented permanent magnet, comprising magnetic material having lower coercivity than the one or more magnet segments of the segmented permanent magnet. A width of the one or more magnet segments of the segmented permanent magnet, comprising magnetic material having higher coercivity than the another or other magnet segments of the segmented permanent magnet, may be identical to, or shorter than, a width of the another or other magnet segments of the segmented permanent magnet, comprising magnetic material having lower coercivity than the one or more magnet segments of the segmented permanent magnet.

The one or more magnet segments of the segmented permanent magnet comprise magnetic material operable at a higher temperature than the another or other magnet segments of the segmented permanent magnet. The one or more magnet segments of the segmented permanent magnet, disposed at opposite ends of the segmented permanent magnet, have high temperature magnetic material, and the another or other magnet segments of the segmented permanent magnet, disposed in a middle of the segmented permanent magnet, may have lower temperature magnetic material. The high temperature magnetic material may be operable at a higher temperature than the lower temperature magnetic material. The one or more magnet segments of the segmented permanent magnet, having high temperature magnetic material, may be smaller than the another or other magnet segments of the segmented permanent magnet, having lower temperature magnetic material. A length of the one or more magnet segments of the segmented permanent magnet, having high temperature magnetic material, may be shorter than a length of the another or other magnet segments of the segmented permanent magnet, having lower temperature magnetic material. A width of the one or more magnet segments of the segmented permanent magnet, having high temperature magnetic material, may be identical to, or shorter than, a width of the another or other magnet segments of the segmented permanent magnet, having lower temperature magnetic material.

An air gap or a non-magnetic material may be disposed between an inner surface of one of the magnet pockets and an outer surface of the one or more of the magnet segments positioned at opposite ends of the segmented permanent magnet.

The plurality of magnet segments comprised in the segmented permanent magnet may directly contact each other.

According to certain exemplary embodiments of the present disclosure, a permanent magnet motor may comprise: a rotor assembly configured to be rotatable relative to a stator, wherein the rotor assembly defines a plurality of magnet pockets, a segmented permanent magnet comprising edge magnet segments disposed at opposite ends of the segmented permanent magnet and one or more middle magnet segments disposed between the edge magnet segments, is disposed in each of the magnet pockets of the rotor assembly, and the edge magnet segments of the segmented permanent magnet include different magnetic material from the one or more middle magnet segments of the segmented permanent magnet. The segmented permanent magnet may be segmented in a circumferential direction. The edge magnet segments of the segmented permanent magnet may comprise rare earth permanent magnet or high energy density magnet. The edge magnet segments of the segmented permanent magnet may comprise samarium cobalt (Sm—Co) magnet or neodymium iron boron (Nd—Fe—B) magnet.

The edge magnet segments of the segmented permanent magnet may comprise magnetic material having higher coercivity than the one or more middle magnet segments of the segmented permanent magnet.

The edge magnet segments of the segmented permanent magnet may comprise magnetic material operable at a higher temperature than the one or more middle magnet segments of the segmented permanent magnet.

The edge magnet segments of the segmented permanent magnet may be smaller than the one or more middle magnet segments of the segmented permanent magnet. A length of the edge magnet segments of the segmented permanent magnet may be shorter than a length of the one or more middle magnet segments of the segmented permanent magnet. A width of the edge magnet segments of the segmented permanent magnet may be identical to, or shorter than, a width of the one or more middle magnet segments of the segmented permanent magnet.

An air gap or a non-magnetic material may be disposed between an inner surface of one of the magnet pockets and an outer surface of the edge magnet segments of the segmented permanent magnet.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
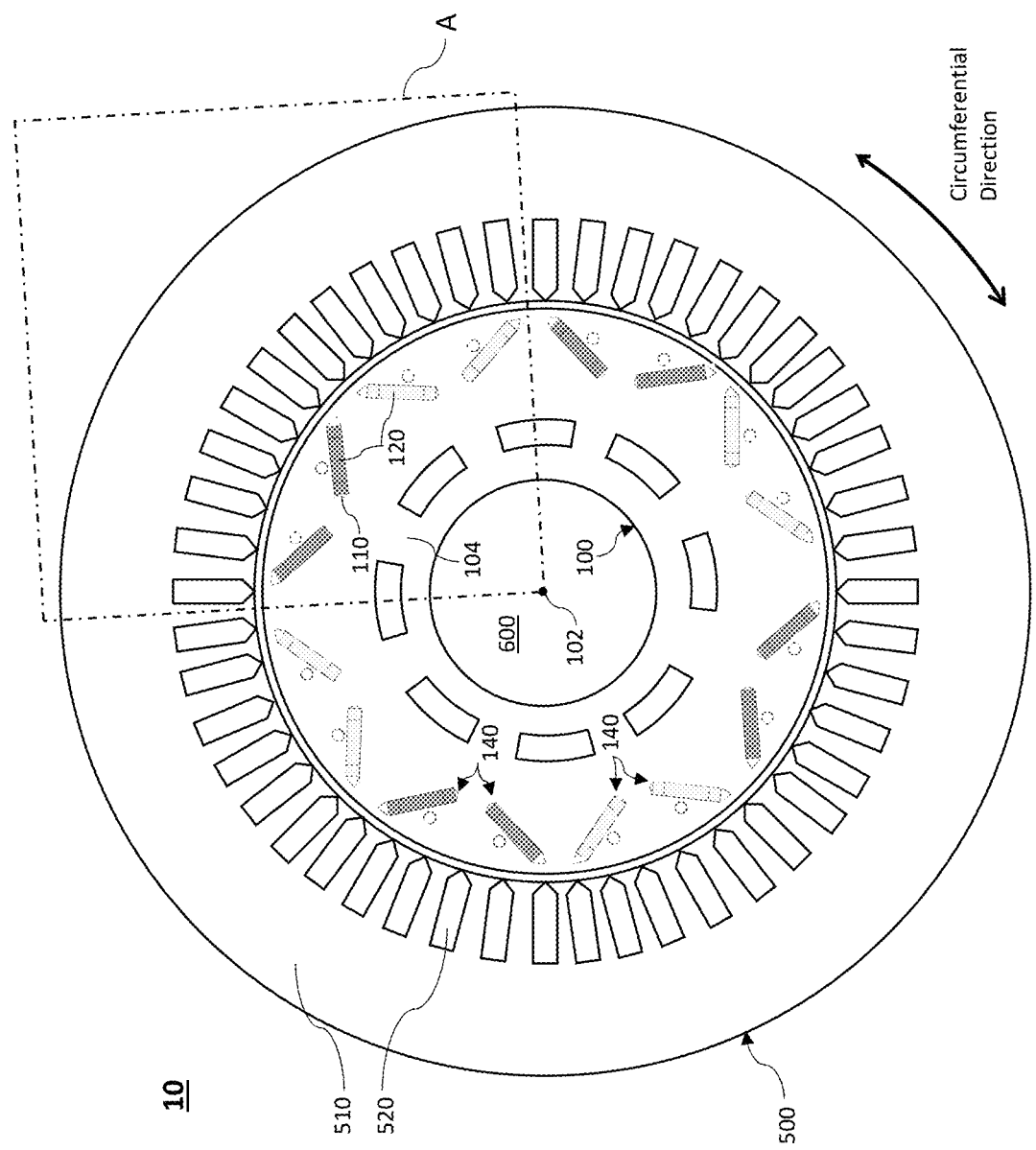
FIG. 1 is a horizontal cross-sectional view of a permanent magnet motor according to an exemplary embodiment of the present disclosure.
Figure 2:
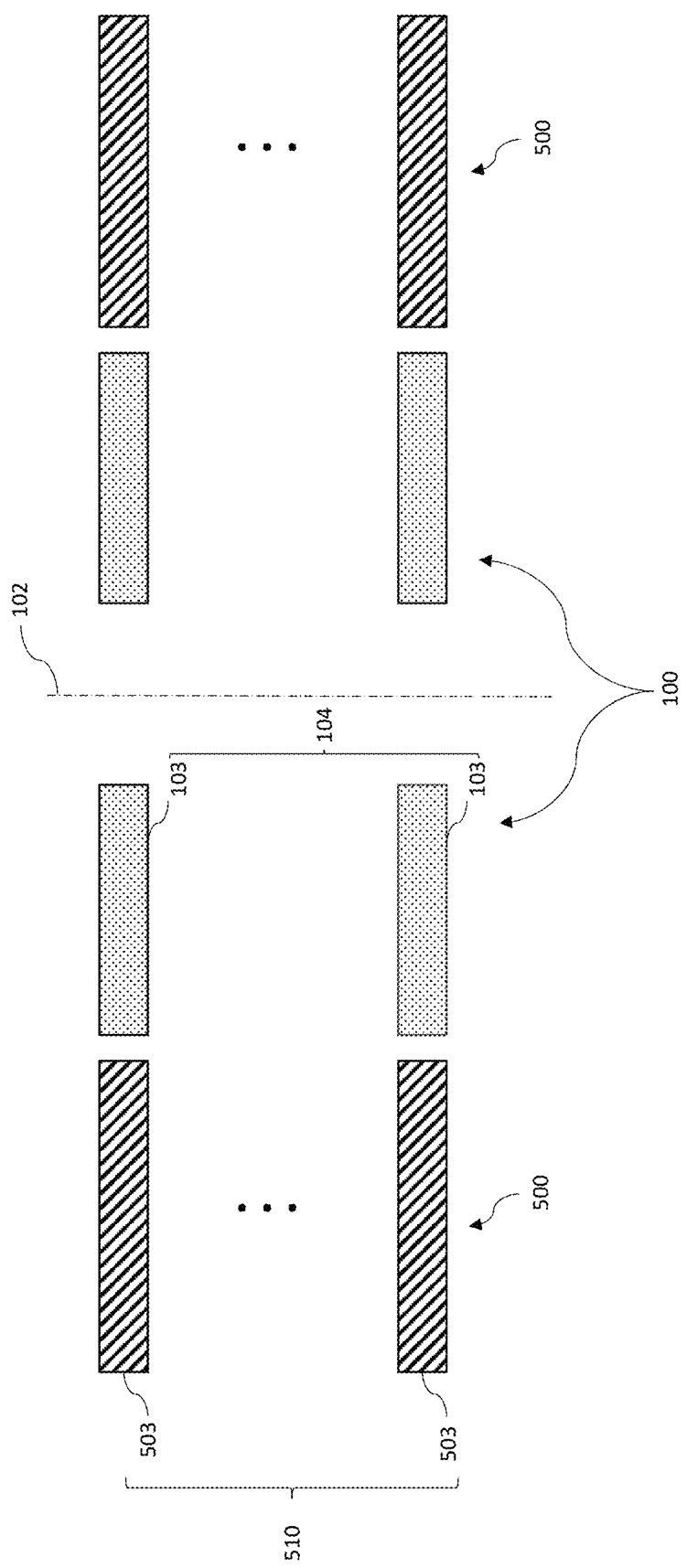
FIG. 2 is a vertical cross-sectional view of a permanent magnet motor according to an exemplary embodiment of the present disclosure.

FIGS. 1 and 2 illustrate cross-sectional views of a permanent magnet motor according to an embodiment of the present disclosure.

A permanent magnet motor 10 includes a rotor assembly 100, a stator 500, and a rotor shaft 600. The rotor assembly 100 is disposed for rotation within, and relatively to, the stator 500. The rotor assembly 100 may be rotatably seated on the rotor shaft 600. Alternatively, the rotor assembly 100 may be disposed about the stator 500 to define an exterior rotor motor. The rotor assembly 100 and the stator 500 each may be disposed about and extend along a central axis 102. The rotor assembly 100 may be disposed concentric with the stator 500.

The stator 500 includes a stator core 510 and electromagnetic windings 520. Conductors are disposed in the stator core 510 to form the electromagnetic windings 520. For example, the stator 500 may be comprised of the iron core 510 made of a stack of stator laminations 503 of FIG. 2 and a winding arrangement 520 for conductors that carry an excitation current. Current flowing through the stator windings 520 generates a stator electromagnetic flux. The stator flux may be controlled by adjusting the magnitude and frequency of the current flowing through the stator windings 520.

The rotor assembly 100 may include a rotor core 104 that is disposed on the rotor shaft 600. The rotor core 104 may radially extend (relative to the central axis 102) between an inner rotor surface and an outer rotor surface. The inner rotor surface may contact and be fixed to the rotor shaft 600 and may be disposed closer to the central axis 102 than the outer rotor surface. The outer rotor surface may be spaced apart from an inner stator surface of the stator 500 by, for example, an air gap therebetween.

As shown in FIG. 2, the rotor assembly 100 and the stator assembly 500 may be implemented as multiple rotor laminations 103 forming the rotor core 104 and multiple stator laminations 503 forming the stator core 510. The multiple rotor laminations 103 and the multiple stator laminations 503 are arranged in an axially stacked relationship. For example, the multiple rotor laminations 103 and the multiple stator laminations 503 are stacked along the central axis 102. Any number of laminations in a given design may be used, depending on design choice.

The rotor assembly 100 is configured to be rotatable about the central axis 102 and defines a plurality of magnet pockets 110 (e.g. holes or cavities) distributed within the rotor assembly 100 along a radially outboard surface of the rotor assembly 100. The magnet pockets 110 may have various configurations such as, for example, but not limited to, a V-type, a spoke-type, a bar-type, an I-type, or any appropriate type. At least one segmented permanent magnet 120 may be disposed in each of the magnet pockets 110. An air gap or a non-magnetic material (e.g. nylon or other filler material) 130 may disposed between an inner surface of the magnet pocket 110 and an outer surface of an end or edge of the segmented permanent magnet 120.

The rotor assembly 100 may comprise the rotor core 104 made of a stack of the rotor laminations 103 and a plurality of segmented permanent magnets 120 inserted within the magnet pockets 110 that are defined by the rotor core 104. The rotor core 104 may be made of, for example, but not limited to, silicon steel, nickel iron, amorphous iron, and the like. The permanent magnets 120 in the rotor assembly 100 may generate a rotor electromagnetic flux. The rotor flux may include harmonic fluxes due to shapes and sizes of the discrete permanent magnets. The stator flux and the rotor flux may be distributed in the air-gap between the rotor assembly 100 and the stator 500. Interaction between the stator flux and the rotor flux causes the rotor assembly to rotate relative to the stator 500.

The rotor assembly 100 has a number of poles 140. Each pole 140 may include one or more magnet pockets 110 in which one or more segmented permanent magnets 120 are inserted. Each group of the segmented permanent magnets 120 disposed in the magnet pockets 110 may form a single magnet pole 140.

In an exemplary embodiment shown in FIG. 1, a plurality (e.g., sixteen) of the magnet pockets 110 are distributed along the radially outboard surface of the rotor assembly 100. Each of the magnet pockets 110 is substantially rectangular in cross-sectional shape. Each of the magnet pockets 110 is configured to facilitate insertion of the segmented permanent magnet 120 into each of the magnet pockets 110 while also providing acceptable retention and reliable positioning of the segmented permanent magnet 120 within each of the magnet pockets 110. One pole 140 may comprise a pair of two magnet pockets 110 forming V-shape, where one segmented permanent magnet 120 is inserted into each magnet pocket 110. Adjacent pairs of two magnet pockets 110 may be formed and disposed symmetrically. A pole location may be generally defined by a center-pole axis 150 that extends radially from the central axis 102 toward the outer surface of the rotor assembly 100 along a midpoint between adjacent magnet pockets 110. The interpolar axes (e.g., 151, 152) may extend radially from the central axis 102 toward the outer surface of the rotor assembly 100 between adjacent poles. Each pole 140 may have an associated surface area on the outer circumferential surface of the rotor assembly 100. Each pole 140 may be represented by the arc length on the surface between adjacent inter-polar axes 151, 152. One or more air holes or non-magnetic material (e.g. nylon or other filler material) 135 may be disposed between the magnet pockets 110 forming a single pole 140.

Each segmented permanent magnet 120 comprises a plurality of magnet segments. The segmented permanent magnet 120 may be segmented in a circumferential direction. Alternatively, the segmented permanent magnet 120 may be segmented in a radial direction or any appropriate direction.

One or more magnet segments included in the segmented permanent magnet 120 have different magnetic material from another or other magnet segments of the segmented permanent magnet 120.

For example, one or more magnet segments comprised in the segmented permanent magnet 120 comprise magnetic material having higher coercivity than another or other magnet segments of the segmented permanent magnet 120. The coercivity may be a degree of resistance to demagnetization which can be caused by temperature, magnetic force, or other external force against a magnet. Magnets can be graded according to the coercivity. For example, a magnet with an "M" (e.g. N35M, N42M, etc.) generally means that a magnet can be used in an operating environment up to 100° C. An "H" material is operable up to 120° C., "SH" up to 150° C., "UH" up to 180° C., "EH" up to 200° C., and a "TH" up to 220° C. However, these are examples of the grades based on operational temperature, and magnets can be graded with consideration of other factors in coercivity grades.

One or more magnet segments of the segmented permanent magnet 120 may include higher grade magnetic material than another or other magnet segments comprised in the same segmented permanent magnet 120. For instance, one or more magnet segments of the segmented permanent magnet 120 comprise high temperature magnetic material while another or other magnet segments of the segmented permanent magnet 120 have lower temperature magnetic material.

The high temperature magnetic material is operable at a higher temperature than the lower temperature magnetic material. The high temperature magnetic material is capable of retaining its magnetic properties even at high temperature. The high temperature magnet may have high Curie Temperature or Curie point, that causes loss of ferromagnetic behavior. The high temperature magnet may be, for example, but not limited to, rare earth permanent magnet or high energy density magnets with magnetic fields stable over a variety of environmental conditions and wide temperature ranges. For instance, the high temperature magnetic material comprises magnetic components of samarium cobalt (Sm—Co) or neodymium iron boron (Nd—Fe—B). Samarian cobalt (Sm—Co) and neodymium iron boron (Nd—Fe—B) are an alloy of the Lanthanide group of elements. Samarium cobalt magnets and neodymium iron boron magnets are available in a number of different grades that span a wide range of properties and application requirements. The Curie temperature for the neodymium magnets (Nd—Fe—B) is roughly 310° C. and samarium cobalt magnets are operable at temperatures up to 350° C., depending upon the grade and permeance coefficient. The high temperature permanent magnet's performances exceed that of the lower temperature permanent magnetic materials such as ferrite or alnico magnets. The high temperature magnetic material may possess high energy density and coercivity and performance stability. The high temperature magnetic material may enable higher temperature operation of electric motors without demagnetization, and can lead to higher power density of the electric motors. The high temperature magnetic material may produce stronger magnetic fields than the lower temperature magnet. The magnetic field typically produced by rare-earth magnets can exceed 1.4 tesla, whereas ferrite or ceramic magnets typically exhibit fields of 0.5 to 1 tesla.

For example, one or more magnet segments of the segmented permanent magnet 120 having higher coercivity, higher grade or higher operable temperature (hereinafter "high temperature magnet segment") may include the components of samarium cobalt (Sm—Co) or neodymium iron boron (Nd—Fe—B), high energy density permanent magnet, or rare earth permanent magnet. Another or other magnet segments of the segmented permanent magnet 120 having lower coercivity, lower grade or lower operable temperature (hereinafter "lower temperature magnet segment") may have magnetic material with H, SH, or UH grade, or conventional permanent magnets such as alnico, ferrite or ceramic magnets.

Figure 3:
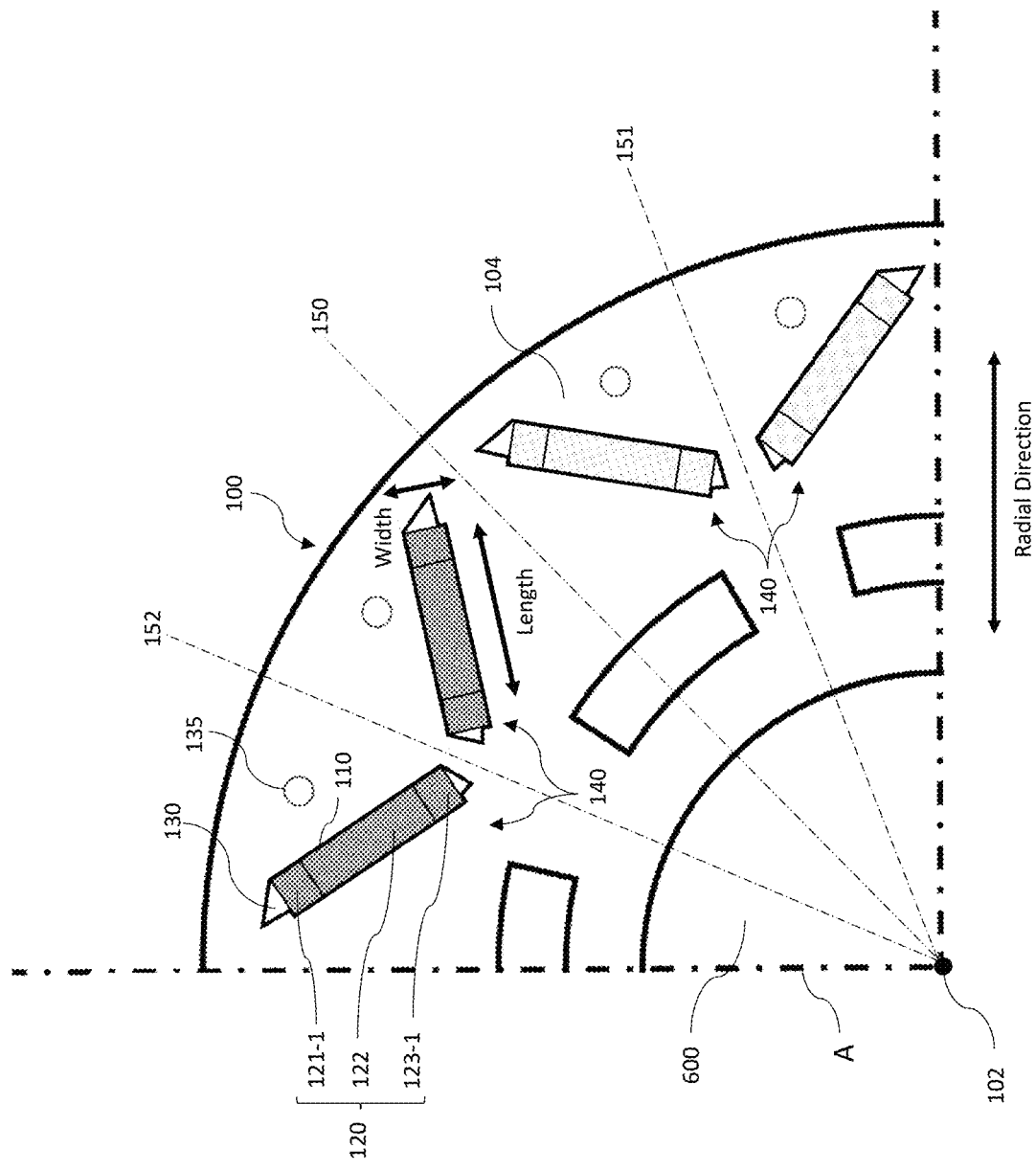
FIGS. 3 and 4 are enlarged views of a square portion A shown in FIG. 1 according to exemplary embodiments of the present disclosure.
Figure 4:
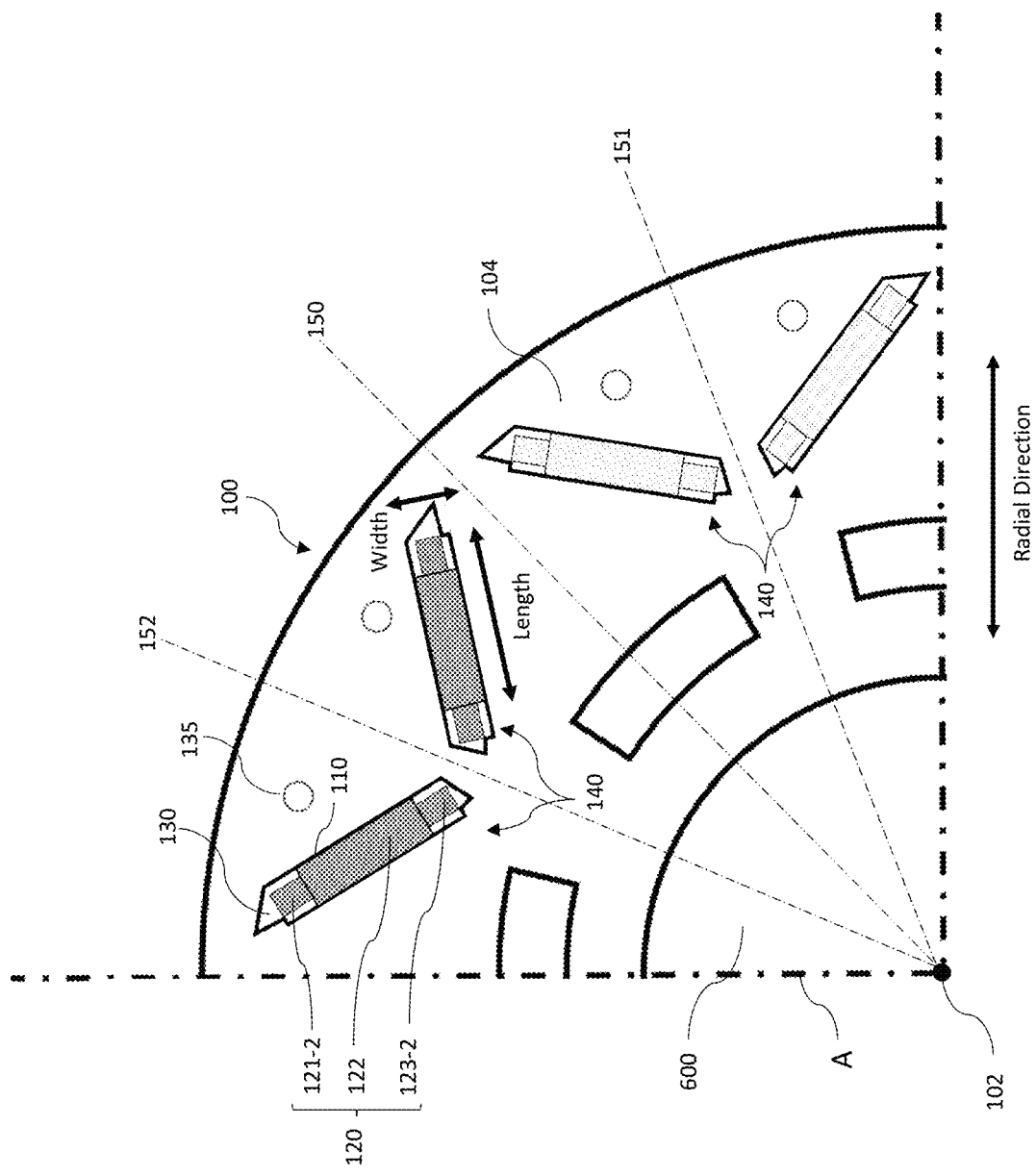

One or more high temperature magnet segments may be positioned at one or both of opposite ends of the segmented permanent magnet 120 while one or more lower temperature magnet segments of the segmented permanent magnet 120 may be disposed between the end or edge segments of the segmented permanent magnet 120, or in the middle of the segmented permanent magnet 120. In exemplary embodiments shown FIGS. 3 and 4, end or edge magnet segments (121-1, 123-1 of FIG. 3 or 121-2, 123-2 of FIG. 4) of the segmented permanent magnet 120 may be high temperature magnet segments, and the middle magnet segment 122 may be a lower temperature magnet segment. The first end magnet segment 121-1, 123-1 and the second end magnet segment 121-2, 123-2 of the segmented permanent magnet 120 may be made of the same high temperature magnetic material as each other, although it is not required. Alternatively, the first end magnet segment 121-1, 123-1 may have different magnetic material from the second end magnet segment 121-2, 123-2. However, the first end magnet segment 121-1, 123-1 and the second end magnet segment 121-2, 123-2 made of different magnetic materials may have identical or similar grades to each other and may have higher coercivity or operable temperature than the middle magnet segment 122. Although FIGS. 3 and 4 illustrate the middle magnet segment 122 of the segmented permanent magnet 120 as one single segment, the segmented permanent magnet 120 may include a plurality of middle magnet segments which consist of the same or different magnetic material as or from each other. Additionally, when the segmented permanent magnet 120 comprises the plurality of middle magnet segments with different magnetic material, the middle magnet segments may have similar grade magnetic material, but not limited thereto.

The high and lower temperature magnet segments of the segmented permanent magnet 120 may have various shapes and sizes depending on particular design and intended usage.

The high temperature magnet segment (e.g. 121-1, 123-1 or 121-2, 123-2) of the segmented permanent magnet 120 may be smaller than the lower temperature magnet segment (e.g. 122) of the segmented permanent magnet 120. The volume ratio between the high temperature magnet segment (e.g. 121-1, 123-1 or 121-2, 123-2) and the lower temperature magnet segment (e.g. 122) may be, for example, but not limited to, 15%:85% to 25%:75% (preferably 20%:80%). This range may reduce the torque ripple with little torque reduction and be cost-effective.

As shown in FIGS. 3 and 4, the width of the high temperature magnet segment (e.g. 121-1, 123-1 or 121-2, 123-2) of the segmented permanent magnet 120 may be shorter than the width of the lower temperature magnet segment (e.g. 122) of the segmented permanent magnet 120. Alternatively, the widths of the high temperature magnet segment (e.g. 121-1, 123-1 or 121-2, 123-2) and the lower temperature magnet segment (e.g. 122) of the segmented permanent magnet 120 are identical to each other, or the high temperature magnet segment (e.g. 121-1, 123-1 or 121-2, 123-2) of the segmented permanent magnet 120 may have a greater width than the lower temperature magnet segment (e.g. 122) of the segmented permanent magnet 120. In the present disclosure, length pertains to the longer side of the segmented permanent magnet 120 while width is the shorter side of the segmented permanent magnet 120.

The high temperature magnet segment (e.g. 121-1, 123-1 or 121-2, 123-2) and the lower temperature magnet segment (e.g. 122) may have various lengths. In one exemplary embodiment of FIG. 3, the widths of the high temperature magnet segment (e.g. 121-1, 123-1 or 121-2, 123-2) and the lower temperature magnet segment (e.g. 122) of the segmented permanent magnet 120 are the same as or substantially similar to each other. In another exemplary embodiment of FIG. 4, the widths of the high temperature magnet segment (e.g. 121-1, 123-1 or 121-2, 123-2) of the segmented permanent magnet 120 and the lower temperature magnet segment (e.g. 122) of the segmented permanent magnet 120 are different from each other. For instance, the high temperature magnet segment (e.g. 121-1, 123-1 or 121-2, 123-2) of the segmented permanent magnet 120 has a shorter width than the lower temperature magnet segment (e.g. 122) of the segmented permanent magnet 120. However, in a certain embodiment, the length of the high temperature magnet segment (e.g. 121-1, 123-1 or 121-2, 123-2) of the segmented permanent magnet 120 may be longer than the width of the lower temperature magnet segment (e.g. 122) of the segmented permanent magnet 120.

The length and width of each of the high and lower temperature magnet segments included in the segmented permanent magnet 120 may be variously changed to achieve low torque ripple and high performance of the motor 10. In other words, the size, width, and length of the high and lower temperature magnet segments may be optimized to minimize the ripple torque and to maximize the motor average torque.

The magnet segments of the segmented permanent magnet 120 may be directly coupled or contacted with each other. Alternatively, air gap or bonding and/or insulating layers disposed between the magnet segments of the segmented permanent magnet 120.

According to various embodiments, a segmented permanent magnet including one or more magnet segments which are made of different magnetic material from other magnet segments may reduce manufacturing cost of a motor. High temperature magnet such as high energy density Rare Earth (RE) permanent magnet (e.g. samarium cobalt (Sm—Co) magnet and neodymium iron boron (Nd—Fe—B) magnet) shows high energy densities and coercivities. Accordingly, the high temperature magnet may provide large energy and increase volume efficiency of the motor. However, the high temperature magnet is high cost material and price sensitive due to unstable supply of materials. By using a segmented permanent magnet consisting of both one or more high temperature magnet segments (preferably at ends or edges of the segmented permanent magnet) and one or more lower temperature magnet segments (preferably in the middle of the segmented permanent magnet) instead of a whole high temperature magnet, the manufacturing cost of the motor may be decreased and the risk of the unstable supply may be reduced. In accordance of some embodiments of the present disclosure, lower temperature permanent magnet segment(s) can replace up to 80% of high temperature permanent magnet.

Figure 5:
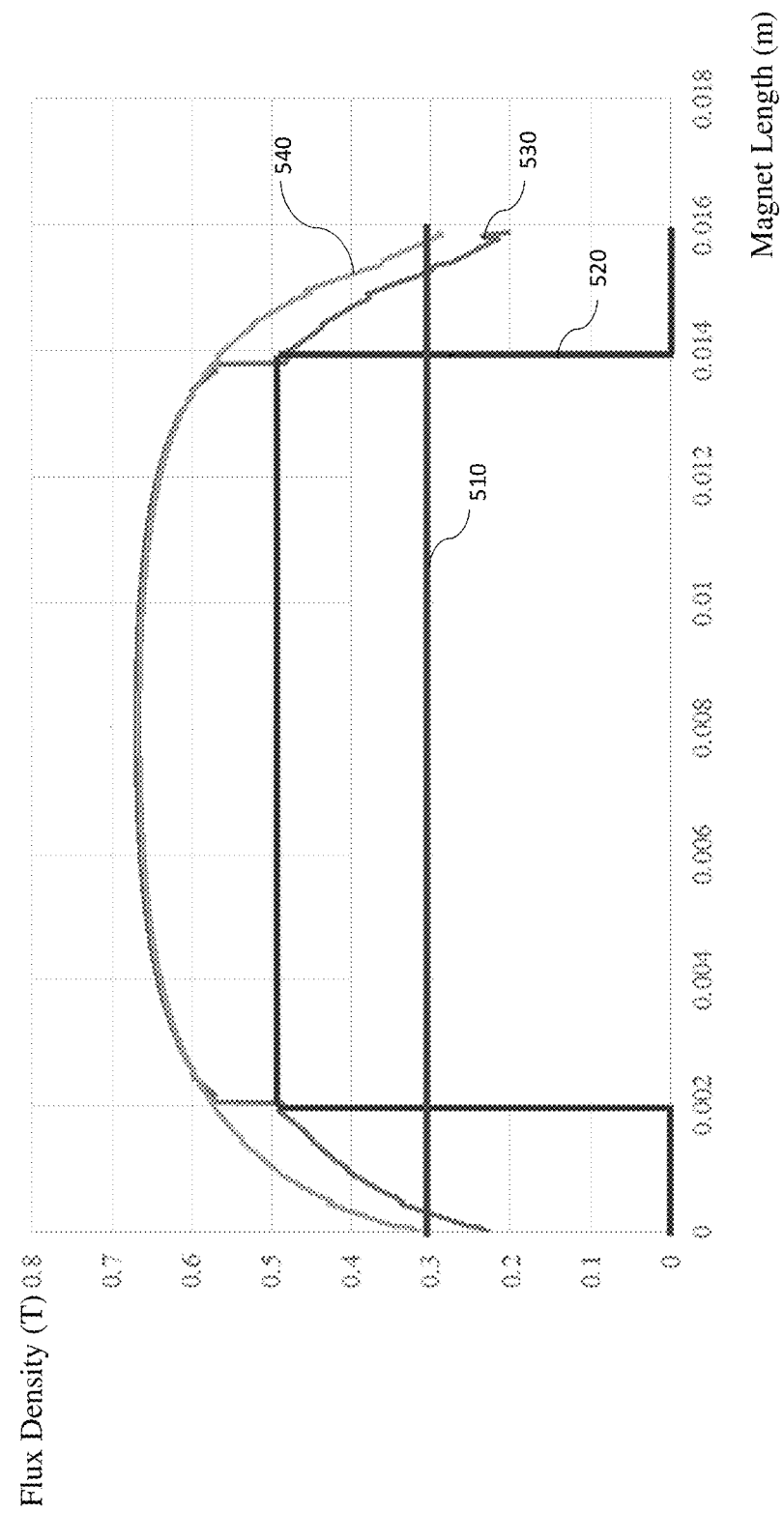
FIG. 5 shows a graph of flux density during demagnetization at 180° C.
Figure 6:
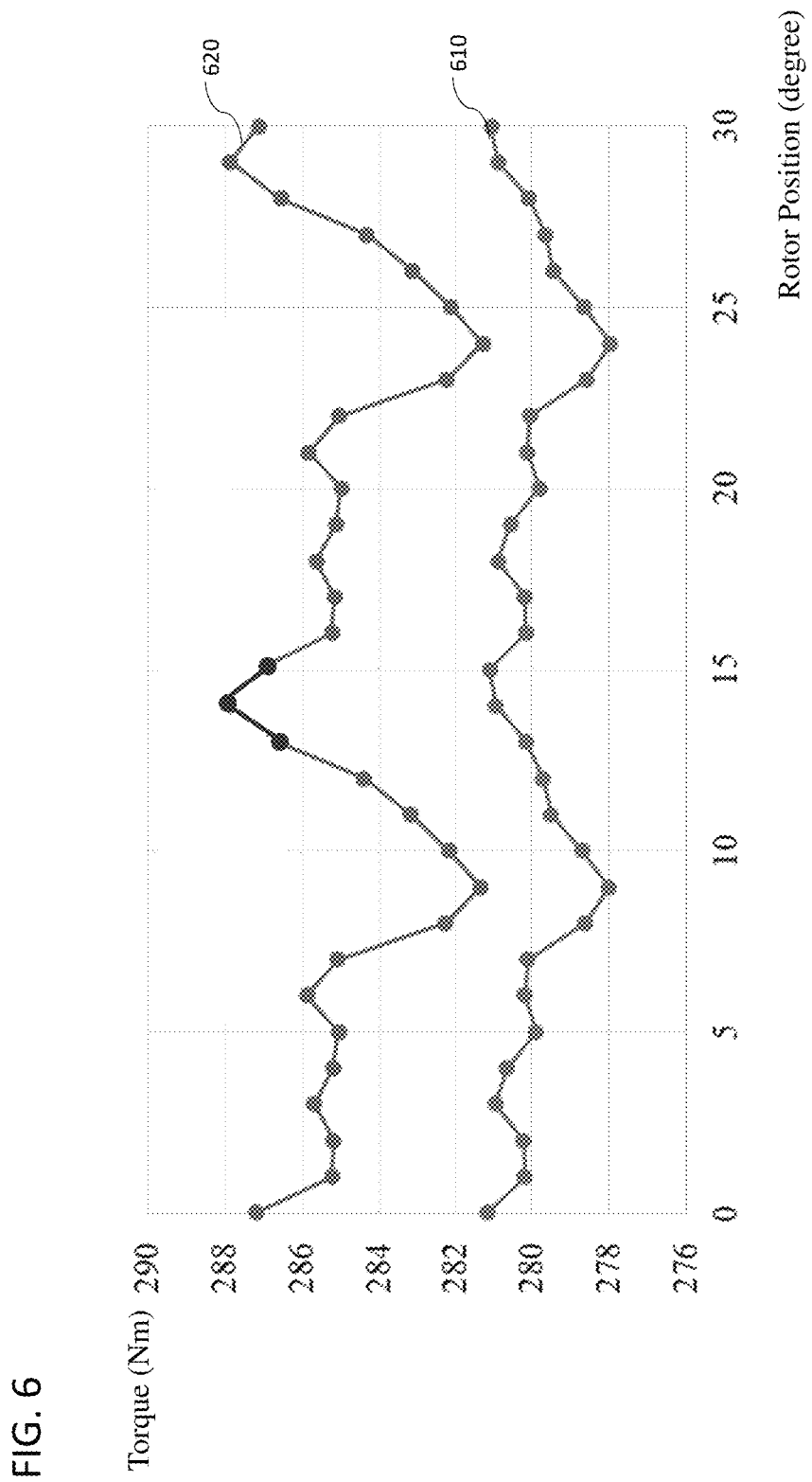
FIG. 6 illustrates a graph of torque versus rotor position.

The segmented permanent magnet having the high temperature magnet segment(s) and the lower temperature magnet segment(s) may not deteriorate the performance of the motor and may improve operating characteristics of the permanent magnet motor in comparison with a motor having a single piece of permanent magnet. As illustrated in FIG. 5, the segmented permanent magnet with the high and lower temperature magnet segments shows similar or higher flux density than a single piece of high temperature permanent magnet in a demagnetization condition. A line 510 represents a flux density of the segmented permanent magnet with the high and lower temperature magnet segments, a line 520 represents a knee point at 180° C. of the segmented permanent magnet with the high and lower temperature magnet segments, a line 530 represents a flux density of the single piece of high temperature permanent magnet, and a line 540 represents a knee point at 180° C. of the single piece of high temperature permanent magnet. In this test, the segmented permanent magnet has the samarium cobalt (Sm—Co) magnet segment at its edges and the SH/H grade magnet segment in the middle of the magnet, and the UH grade magnet is used as a single piece of magnet. FIG. 5 shows that the segmented permanent magnet consisting of high and lower temperature magnet segments may achieve similar or better demagnetization performance when compared to the single piece of high temperature permanent magnet. Additionally, the segmented permanent magnet including high and lower temperature magnet segments may reduce undesirable torque ripple that may result in unwanted vibration and noise. A line 610 represents a torque of the segmented permanent magnet with the high and lower temperature magnet segments, and a line 620 represents a torque of the single piece of high temperature permanent magnet. The graph of FIG. 6 shows that the torque ripple of the segmented permanent magnet with high and lower temperature magnet segments is less than a single piece of high temperature permanent magnet. According to certain embodiments of the present disclosure, the segmented permanent magnet may reduce the torque ripple by more than 60% with 2% average torque reduction.

Hence, some embodiments of a rotor assembly having a segmented permanent magnet consisting of high and lower temperature magnet segments may improve demagnetization performance, lower the manufacturing cost, and reduce the torque ripple of the motor. Further, certain embodiments of a rotor assembly may be applicable to any stator design.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A permanent magnet motor comprising:
   a rotor assembly configured to be rotatable relative to a stator,
   wherein:
   the rotor assembly has a plurality of magnet pockets and segmented permanent magnets, each of the segmented permanent magnets comprising a plurality of magnet segments, which include one or more magnet segments of each of the segmented permanent magnets having different magnetic material from another or other magnet segments of each of the segmented permanent magnets, is disposed in each of the magnet pockets of the rotor assembly, wherein the plurality of magnet segments comprised in each of the segmented permanent magnets are arranged in a length direction of each of the magnet pockets of the rotor assembly; and
   a pair of adjacent two of the segmented permanent magnets, disposed substantially symmetrically to each other, each of the segmented permanent magnets comprising the plurality of magnet segments, forms one pole, wherein one or more air holes and/or one or more non-magnetic materials disposed apart from the segmented permanent magnets are disposed between the pair of adjacent two of the segmented permanent magnets disposed substantially symmetrically to each other,
   wherein an air gap is disposed between an inner surface of one of the magnet pockets and an outer surface of the one or more of the magnet segments positioned at opposite ends of each of the segmented permanent magnets.

2. The permanent magnet motor of claim 1, wherein each of the segmented permanent magnets is segmented in a circumferential direction.

3. The permanent magnet motor of claim 1, wherein the one or more magnet segments of each of the segmented permanent magnets comprise magnetic material having higher coercivity than the another or other magnet segments of each of the segmented permanent magnets.

4. The permanent magnet motor of claim 1, wherein the one or more magnet segments of each of the segmented permanent magnets comprise magnetic material operable at a higher temperature than the another or other magnet segments of each of the segmented permanent magnets.

5. The permanent magnet motor of claim 1, wherein the one or more magnet segments of each of the segmented permanent magnets comprise rare earth permanent magnet or high energy density magnet.

6. The permanent magnet motor of claim 1, wherein the one or more magnet segments of each of the segmented permanent magnets comprise samarium cobalt (Sm—Co) magnet, Ferrite or neodymium iron boron (Nd—Fe—B) magnet.

7. The permanent magnet motor of claim 1, wherein:
   the one or more magnet segments of each of the segmented permanent magnets, comprising magnetic material having higher coercivity than the another or other magnet segments of each of the segmented permanent magnets, are disposed at opposite ends of each of the segmented permanent magnets, and the another or other magnet segments of each of the segmented permanent magnets, comprising magnetic material having lower coercivity than the one or more magnet segments of each of the segmented permanent magnets, are disposed in a middle of each of the segmented permanent magnets.

8. The permanent magnet motor of claim 1, wherein:
the one or more magnet segments of each of the segmented permanent magnets, disposed at opposite ends of the segmented permanent magnet, have high temperature magnetic material,
the another or other magnet segments of each of the segmented permanent magnets, disposed in a middle of each of the segmented permanent magnets, have lower temperature magnetic material, and
the high temperature magnetic material is operable at a higher temperature than the lower temperature magnetic material.

9. The permanent magnet motor of claim 1, wherein the one or more magnet segments of each of the segmented permanent magnets, comprising magnetic material having higher coercivity than the another or other magnet segments of each of the segmented permanent magnets, is smaller than the another or other magnet segments of each of the segmented permanent magnets, comprising magnetic material having lower coercivity than the one or more magnet segments of each of the segmented permanent magnets.

10. The permanent magnet motor of claim 1, wherein:
the one or more magnet segments of each of the segmented permanent magnets, having high temperature magnetic material, is smaller than the another or other magnet segments of each of the segmented permanent magnets, having lower temperature magnetic material, and
the high temperature magnetic material is operable at a higher temperature than the lower temperature magnetic material.

11. The permanent magnet motor of claim 1, wherein a length of the one or more magnet segments of each of the segmented permanent magnets, comprising magnetic material having higher coercivity than the another or other magnet segments of each of the segmented permanent magnets, is shorter than a length of the another or other magnet segments of the segmented permanent magnet, comprising magnetic material having lower coercivity than the one or more magnet segments of each of the segmented permanent magnets.

12. The permanent magnet motor of claim 1, wherein:
a length of the one or more magnet segments of each of the segmented permanent magnets, having high temperature magnetic material, is shorter than a length of the another or other magnet segments of each of the segmented permanent magnets, having lower temperature magnetic material, and
the high temperature magnetic material is operable at a higher temperature than the lower temperature magnetic material.

13. The permanent magnet motor of claim 1, wherein a width of the one or more magnet segments of each of the segmented permanent magnets, comprising magnetic material having higher coercivity than the another or other magnet segments of each of the segmented permanent magnets, is identical to a width of the another or other magnet segments of each of the segmented permanent magnets, comprising magnetic material having lower coercivity than the one or more magnet segments of each of the segmented permanent magnets.

14. The permanent magnet motor of claim 1, wherein:
a width of the one or more magnet segments of each of the segmented permanent magnets, having high temperature magnetic material, is identical to a width of the another or other magnet segments of each of the segmented permanent magnets, having lower temperature magnetic material, and
the high temperature magnetic material is operable at a higher temperature than the lower temperature magnetic material.

15. The permanent magnet motor of claim 1, wherein a width of the one or more magnet segments of each of the segmented permanent magnets, comprising magnetic material having higher coercivity than the another or other magnet segments of each of the segmented permanent magnets, is shorter than a width of the another or other magnet segments of each of the segmented permanent magnets, comprising magnetic material having lower coercivity than the one or more magnet segments of each of the segmented permanent magnets.

16. The permanent magnet motor of claim 1, wherein:
a width of the one or more magnet segments of each of the segmented permanent magnets, having high temperature magnetic material, is shorter than a width of the another or other magnet segments of each of the segmented permanent magnets, having lower temperature magnetic material, and
the high temperature magnetic material is operable at a higher temperature than the lower temperature magnetic material.

17. The permanent magnet motor of claim 1, wherein the one or more magnet segments of each of the segmented permanent magnets include high temperature magnetic material and the another or other magnet segments of each of the segmented permanent magnets include lower temperature magnetic material to reduce torque ripple and/or improve demagnetization.

18. The permanent magnet motor of claim 1, wherein each of the segmented permanent magnets is a bar shape.

19. The permanent magnet motor of claim 1, wherein a length and width of the one or more magnet segments of each of the segmented permanent magnets, comprising magnetic material having higher coercivity than the another or other magnet segments of each of the segmented permanent magnets, are shorter than a length and width of the another or other magnet segments of the segmented permanent magnets, comprising magnetic material having lower coercivity than the one or more magnet segments of each of the segmented permanent magnets.

20. A permanent magnet motor comprising:
a rotor assembly configured to be rotatable relative to a stator,
wherein the rotor assembly defines a plurality of magnet pockets and segmented permanent magnets, each of the segmented permanent magnets comprising edge magnet segments disposed at opposite ends of the segmented permanent magnet and one or more middle magnet segments disposed between the edge magnet segments, is disposed in each of the magnet pockets of the rotor assembly, and the edge magnet segments of the segmented permanent magnet include high temperature magnetic material and the one or more middle magnet segments include lower temperature magnetic material to reduce torque ripple and/or improve demagnetization, wherein the edge magnet segments and the one or more middle magnet segments of each of the segmented permanent magnets are arranged in a length direction of each of the magnet pockets of the rotor assembly; and a pair of adjacent two of the segmented permanent magnets, disposed substantially symmetrically to each other, each of the segmented permanent magnets comprising the edge and middle magnet segments, forms one pole, wherein one or more air holes and/or one or more non-magnetic materials disposed apart from the segmented permanent magnets are disposed between the pair of adjacent two of the segmented permanent magnets disposed substantially symmetrically to each other, wherein an air gap is disposed between an inner surface of one of the magnet pockets and an outer surface of the edge magnet segments disposed at the opposite ends of each of the segmented permanent magnets.

21. The permanent magnet motor of claim 20, wherein a length and width of the edge magnet segments of the segmented permanent magnet including the high temperature magnetic material are shorter than a length and width of the another or other magnet segments of the one or more middle magnet segments including the lower temperature magnetic material.

* * * * *